United States Patent [19]
Kawaguchi et al.

[11] 4,328,398
[45] May 4, 1982

[54] DIGITAL MULTI-FREQUENCY RECEIVER

[75] Inventors: Masaharu Kawaguchi; Yoshikatu Shiraishi; Kazuhiro Maruyama, all of Tokyo; Hitoshi Imagawa, Hachioji; Yoshimasa Kaneko, Sayama, all of Japan

[73] Assignees: Oki Electric Industry Co., Ltd.; Nippon Telegraph & Telephone Public Corp., both of Tokyo, Japan

[21] Appl. No.: 148,232

[22] Filed: May 9, 1980

[30] Foreign Application Priority Data

May 22, 1979 [JP] Japan ................................ 54-62141
May 22, 1979 [JP] Japan ................................ 54-62142

[51] Int. Cl.³ .......................................... H04M 1/50
[52] U.S. Cl. .............................. 179/84 VF; 364/724
[58] Field of Search ............... 179/84 VF; 328/138; 364/484, 724, 726; 324/78 D; 370/110

[56] References Cited

U.S. PATENT DOCUMENTS 4,055,730 10/1977 Stapleford et al. ............ 179/84 VF
4,211,897 7/1980 Ichikawa et al. ............... 179/84 VF

OTHER PUBLICATIONS

"An Approach to the Implementation of Digital Filters", by L. B. Jackson et al., IEEE Transactions on Audio and Electroacoustics, vol. AU-16, No. 3, Sep. 1968, pp. 413-421.
"Design and Performance of a Digital Multifrequency Receiver", by C. R. Baugh, IEEE Transactions on Communications, vol. Com-25, No. 6, Jun. 1977, pp. 608-615.

Primary Examiner—John H. Wolff
Assistant Examiner—J. A. Popek
Attorney, Agent, or Firm—Armstrong, Nikaido, Marmelstein & Kubovcik

[57] ABSTRACT

A digital multi-frequency receiver for the use in an electronic telephone exchange system for detecting MF signals (700, 900, 1100, 1300, 1500 and 1700 Hz) in the CCITT No. 5 system. The digital multi-frequency receiver comprises a recursive digital filter for detecting each of the MF signals on a time divisional basis, an absolute value circuit for providing the absolute value of the output of the recursive digital filter, a comparator for comparing the output of the absolute value circuit with a variable threshold to provide the detected MF signal information, and a circuit for providing the variable threshold by selecting the maximum value from among, (i) the predetermined fixed value, (ii) the product of the value α which is less than but close to 1 and the maximum value of the variable threshold circuit in a preceding frame, and (iii) the maximum value of the output of the absolute value circuit in a present frame.

6 Claims, 10 Drawing Figures

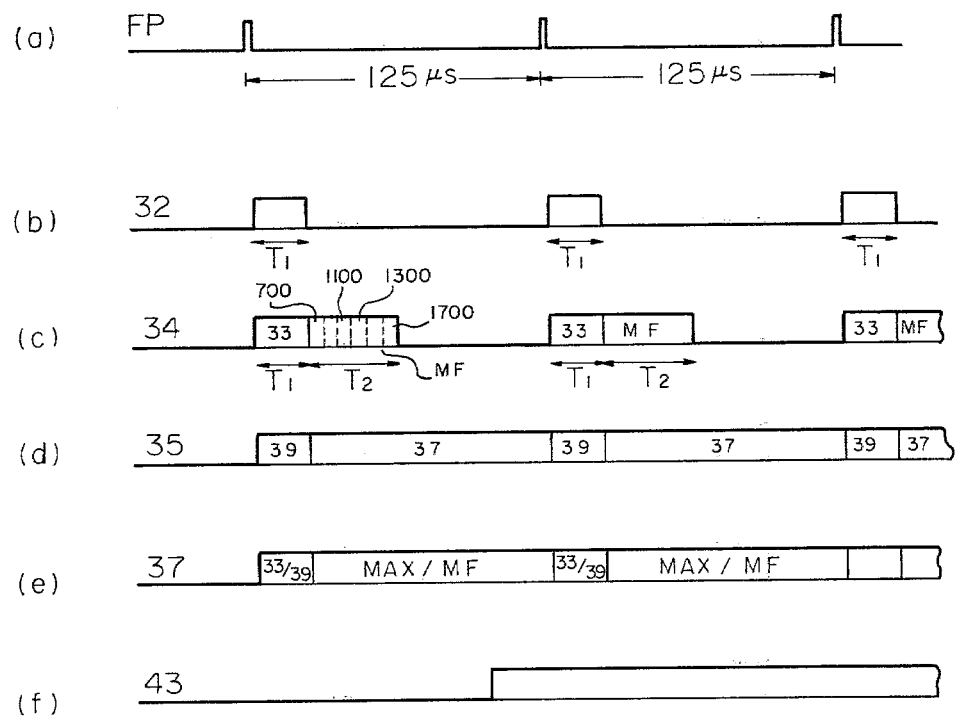

DIGITAL MULTI-FREQUENCY RECEIVER

BACKGROUND OF THE INVENTION

The present invention relates to a digital multi-frequency receiver, in particular, relates to such an apparatus which is utilized for the detection of tone signals in a digitalized telephone switching system.

The present invention is utilized preferably for the detection of MF (Multi-Frequency) signals in a trunk line between telephone exchange stations when said MF signals are in the No. 5 standard (recommendation Q.213) recommended by CCITT (International Telegraph and Telephoe Consultative Committee) and CCITT is one of the subsidiary organizations of the United Nations.

According to that No. 5 system, there are six frequency signals (MF signal), 700 Hz, 900 Hz, 1100 Hz, 1300 Hz, 1500 Hz, and 1700 Hz. The combination of two frequencies of those six frequencies are transmitted at the same time for controlling telephone exchange systems and/or subscriber terminals. The No. 5 system also defines the level of the MF signals, that is to say, the level of those signals must be in the range higher than $-26$ dB and must be lower than $-4$ dB. When the level is lower than $-36$ dB, that signal must be neglected. When the level is in the range between $-36$ dB and $-26$ dB, it is the discretion of the reception side whether the signal is detected or not. Further, the levels of the two frequencies received at the same time may have the level difference less than 7 dB.

When the MF signals are in an analog form, the detection of each of the MF signals are performed through a plurality of analog type bandpass filters. However, when the MF signals are in digital form, the MF signals must be detected through a digital process.

A prior multi-frequency detection system in a digital form utilized the principle of the Discrete Fourier Transform (DET) process. FIG. 1 is the block diagram of the prior frequency detection system utilizing that DFT process.

In FIG. 1, the reference numeral 1 is an input terminal receiving an input signal involving MF signals in a digital form, 2 is a multiplicator, 3 is a window function generator for providing the predetermined time slot (for instance 10 mS) with the predetermined amplitude characteristics for the DFT process, 4 is a DFT calculator, 5 is a sin signal generator which provides the sinusoidal wave having the same frequency to be detected, 6 is a cos signal generator which provides the cosine signal having the same frequency to be detected. The reference numeral 7 is a reference level source, 8 is a comparator, 9 is a latch and majority decision circuit, and 10 is an output terminal providing the detected MF signals.

In FIG. 1, the input signal applied to the input terminal 1 is applied to the multiplicator 2 which provides the product of the input signal and the window function. The output product of the multiplicator 2 is applied to the DFT circuit 4, which also receives the core frequency $f_k$ from the generators 5 and 6. The calculation in the DFT circuit is the following formula;

$$(\Sigma f_i \sin 2\pi f_k t)^2 + (\Sigma f_i \cos 2\pi f_k t)^2$$

where $f_i$ is the input signal frequency from the input terminal 1, $\sin 2\pi f_k t$ is the output of the generator 5, and $\cos 2\pi f_k t$ is the output of the generator 6. The comparator 8 compares the output of the DFT circuit 4 with the reference level provided by the reference level source 7, and the output of the comparator 8 is applied to the output logic 9 which holds the comparator output and performs the majority decision to determine the output signal. The output of the circuit 9 is applied to the output terminal 10 providing the detected MF signal.

In the above circuit, the DFT circuit 4 has the characteristics equivalent to a bandpass filter having the center frequency $f_k$.

The DFT circuit has the natures as follows.

(1) The DFT circuit can detect only the frequency $f_k(=i/T_w)$, where i is an integer from 1 to $t_w/2T$, $T_2$ is the period of the window function, T is the sampling period of the input signal. Accordingly, the period of the window function must be equal to the greatest common measure (GMC) of all the frequencies to be detected. When the MF signals with 700, 900, 1100, 1300, 1500 and 1700 Hz are to be detected, that period must be 10 mS (100 Hz).

(2) The characteristics of the bandpass filter of the DFT circuit is determined by the duration and the curve of the window function. Therefore, the duration of the window function restricts the high speed calculation in the DFT circuit.

(3) Since the input signal is not synchronized with the window function, the characteristics of the bandpass filter by the DFT circuit is deteriorated when the input signal starts or stops during the window function period and/or the input signal is interrupted for a short time during the window function period.

Accordingly, the prior frequency receiver based upon a DFT circuit has the disadvantages that it takes a long time to detect the frequency when the duration of the window function is long due to the small greatest common measure of the frequencies to be detected, and that the allowable level range of the input signal is rather narrow, since that range is defined by the window function, and the reference level is fixed.

SUMMARY OF THE INVENTION

It is an object, therefore, of the present invention to overcome the disadvantages and limitations of a prior multi-frequency receiver by providing a new and improved multi-frequency receiver.

It is also an object of the present invention to provide a digital multi-frequency receiver which can detect MF signals quickly and allow the wide operational range of an input signal.

The above and other objects are attained by a digital multi-frequency receiver for detecting particular frequencies in a digitalized input signal comprising of an input terminal for receiving said digitalized input signal; a digital filter block connected to said input terminal having a digital bandpass filter for detecting the particular frequencies on a time divisional basis, a coefficient generator for providing coefficients for the operation of said digital filter, and an input control circuit for operating said digital filter as a recursive digital filter by providing an input signal to said digital filter recursively and selecting coefficients in said coefficient generator; an absolute value circuit connected to the output of said digital filter block for providing the absolute digital value of the output of the digital filter block; a comparator for comparing the output of the absolute value circuit with a variable threshold; means for providing the compared result by the comparator to an output terminal and indicating the presence of the particular frequencies when the output of the absolute value circuit is higher than the variable threshold; and means for providing said variable threshold to said comparator by selecting the maximum value among, (1) the predetermined fixed value, (2) the product of the predetermined value $\alpha$ which is smaller than but closer to one and the maximum value of the variable threshold means in the preceding frame, and (3) the output of the absolute value circuit in the present frame.

It should be appreciated that two of the important features of the present invention are the use of a recursive digital filter, and the comparator having a variable threshold. The former provides the quick detection of MF signals, and facilitates a multiplexed MF signal receiver, which can serve commonly for a plurality of telephone channels. The latter provides the wide operational range of the level of an input signal, that is to say, an input signal with a very high level and with a very low level are detected easily, by adjusting the threshold level of the comparator so that the threshold is high when an input signal level is high and the threshold is low when an input signal level is low.

Further, the fact that the value $\alpha$ which is smaller than one is very close to one ($=1$) is the feature of the present invention. That feature provides the stable threshold with a desired time constant.

BRIEF DESCRIPTION OF THE DRAWINGS

The foregoing and other objects, features, and attendant advantages of the present invention will become better understood by means of the following description and accompanying drawings wherein;

FIG. 4, including $a$-$f$, is the operational time chart of the apparatus in FIG. 2.

DESCRIPTION OF THE PREFERRED EMBODIMENTS

Figure 1:
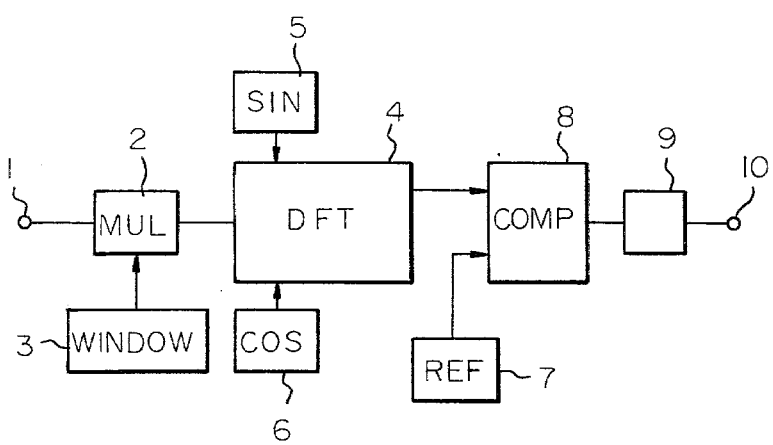
FIG. 1 is the block diagram of the prior MF signal receiver based upon DFT process.
Figure 2:
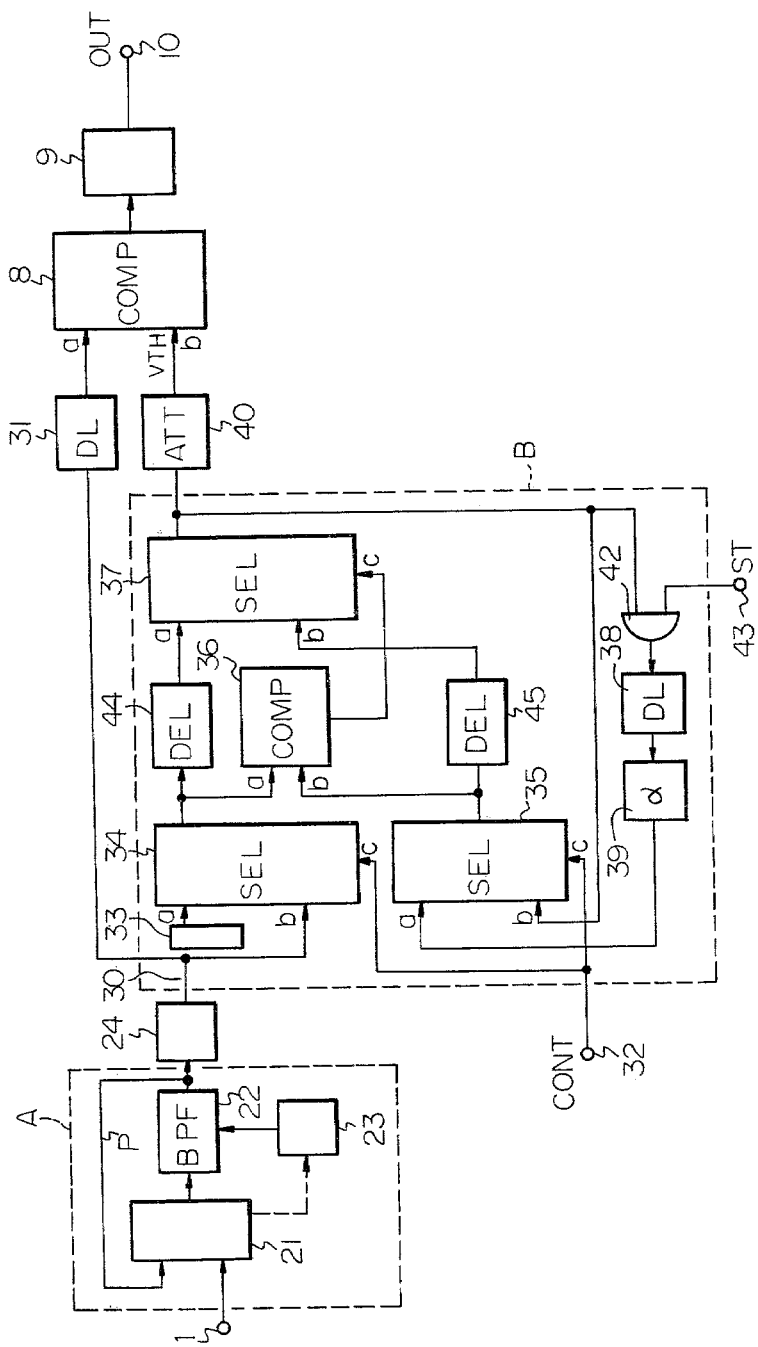
FIG. 2 is the block diagram of the MF signal receiver according to the present invention.

FIG. 2 is the block diagram of the embodiment of the digital multi-frequency receiver according to the present invention.

In FIG. 2, the block A is a recursive digital filter, and the block B is the maximum level detector having an adaptive threshold level, or the variable threshold level (VTH). The block B provides the variable threshold which is the maximum value among, (1) the predetermined fixed value, (2) the product of the value $\alpha$ which is less than one but is closer to one and the maximum value of the output of the block B in the preceding frame, and (3) the maximum value of the output of the absolute value circuit in the present frame. In order to detect and hold the maximum value, the block B operates like a peak hold circuit having a peak value detector and a smoother (low pass filter) in an analog circuit.

Figure 3A:
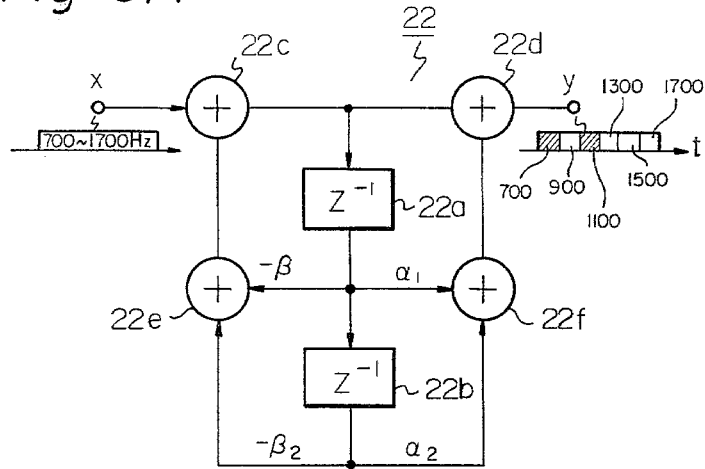
FIG. 3A is the block diagram of the recursive digital filter utilized in the apparatus in FIG. 2.

The reference numeral 1 is an input terminal which MF signals with two of the 700, 900, 1100, 1300, 1500 and 1700 Hz are applied. The reference numeral 21 is an input control circuit for controlling the operation of the digital type bandpass filter 22. And, 23 is a coefficient generator for the digital filter 22. The digital filter 22 is a conventional one, and the example of the configuration is shown in FIG. 3A, in which (x) is the input terminal of the digital filter, (y) is the output terminal of the digital filter, 22a and 22b are delay lines providing the delay time equal to the unit sampling time of the input signal and are implemented by shift registers, 22c and 22d are adders, 22e and 22f are also adders. The symbols ($\alpha_1$), ($\alpha_2$), ($\beta_1$) and ($\beta_2$) show coefficients, which means, for instance, the output of the first delay line 22a is multiplied by ($\alpha_1$) and the product of the multiplication is applied to the adder 22f. The digital filter in FIG. 3A is a quadratic filter since two delay lines 22a and 22b are included, and a biquadratic digital filter is obtained by connecting two quadratic digital filters in a series, or by applying the output signal (y) to the input (x) recursively. The characteristics and/or the center frequency of a digital filter depends upon the coefficients ($\alpha_1$), ($\alpha_2$), ($\beta_1$) and ($\beta_2$).

The input control circuit 21 controlls the operation of the digital filter 22 by selecting the appropriate set of coefficients and the input signal applied to the digital filter, and then, the digital filter operates recursively on the time divisional basis.

The operation of the recursive digital filter A in FIG. 2 is as follows.

First, the input signal applied to the terminal 1 is stored temporarily in the first memory (not shown) provided in the input control circuit 21 for the predetermined duration. Then, the input control circuit 21 selects the set of coefficients for the center frequency 700 Hz in the coefficient generator 23, and provides the signal to the digital filter 22 from the memory of the input control circuit 21. The output of the digital filter 22 is applied again to the input control circuit 21 through the line (p) in FIG. 2, and the output of the digital filter 22 is stored temporarily in the other memory (not shown) in the input control circuit 21. Then, the content of the other memory is read out and is applied to the digital filter 22 again. Therefore, the output of the digital filter 22 is equivalent to the output signal of the biquadratic bandpass filter having the center frequency of 700 Hz.

Next, the input control circuit 21 changes the set of coefficients to those of 900 Hz, and the contents of the first memory is applied to the digital filter, and the output of the digital filter is applied to the input of the digital filter again through the input control circuit 21. Thus, the output signal equivalent to the output signal of the biquadratic bandpass filter having the center frequency 900 Hz is obtained.

Similarly, the input control circuit 21 changes the set of coefficients to those of 1100, 1300, 1500 and 1700 Hz, and the input signal stored in the first memory is applied to the digital filter recursively. Accordingly, the digital filter block A operates as a bandpass filter having the center frequencies 700, 900, 1100, 1300, 1500 and 1700 Hz on the time divisional basis. The coefficient generator 23 is implemented by a conventional read-only-memory (ROM) storing the appropriate fixed coefficients which are selectively read out according to the control of the input control circuit.

Thus, the input signal having two of 700 through 1700 Hz distributed uniformly, is processed by the digital filter, and the output signal of the digital filter has six time slots each assigned to 700 through 1700 Hz two of which are filled as shown in FIG. 3A.

Although a single pair of delay lines 22a and 22b are shown in FIG. 3A for the simplicity of the drawing, it should be appreciated that said pair of delay lines are provided for each frequency (700–1700 Hz), and for each quadratic filter for the recursive operation of the digital filter. Thus, twelve pairs of delay lines in total are provided in an actual circuit.

Figure 3B:
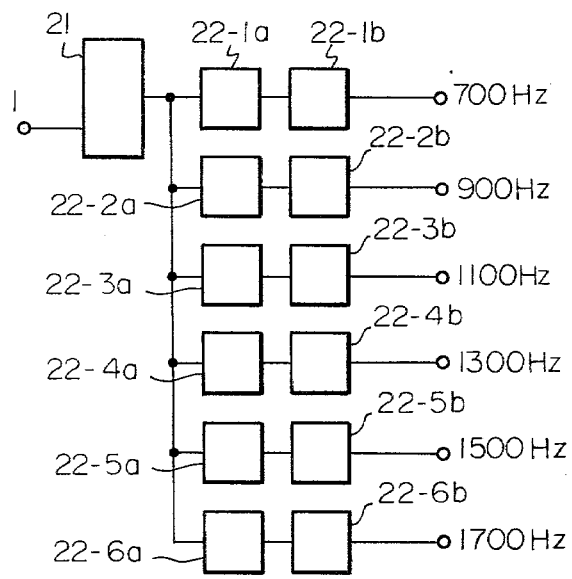
FIG. 3B is the equivalent circuit of the recursive digital filter in FIG. 3A.

From the above explanation, it should be appreciated that the digital filter block A in FIG. 2 is equivalent to the filters in FIG. 3B, in which 22-1a through 22-6a, and 22-1b through 22-6b are quadratic digital filters, and the center frequency of the filters 22-1a and 22-1b is 700 Hz, the center frequency of the filters 22-2a and 22-2b is 900 Hz, and the center frequency of the filters 22-6a and 22-6b is 1700 Hz.

Other types of a conventional digital filter is available for the present invention, instead of the configuration of FIG. 3A, and the article entitled "An approach to the implementation of digital filters" in IEEE Transaction on audio and electroacoustics Vol. au-16, No.3 September, 1968, pp. 413–421, discloses a digital filter.

The output of the recursive digital filter block A is applied to the absolute value circuit 24, which provides the absolute value of the output of the filter block A. When the output of the filter block A is expressed by the 2's complement system in PCM code, the absolute value is obtained simply by the exclusive-OR logic operation between a sign bit and each of component bits of the output of the filter A. Of course, each sign bit is automatically changed to the positive one in this case.

The output 30 of the absolute value circuit 24 is applied to the comparator 8 through the delay circuit 31, and the maximum level detector block B. The reference level or the threshold of the comparator 8 is variable depending upon the highest level of an input signal. That variable threshold (VTH) is applied to the comparator 8 from the maximum level detector block B through the attenuator 40. The attenuator 40 is provided to comply with the CCITT No. 5 recommendation that two MF signals may have the level difference less than 7 dB. Further, the delay circuit 31 is provided for compensating the delay of the operation in the block B. That delay circuit is actually implemented by a shift register.

The comparator 8 compares the output of the absolute value circuit 24 with the variable threshold which is the output of the block B. The level of VTH depends upon the highest level of the input signal as mentioned hereafter. When the former is higher than the latter, the comparator 8 provides the output indicating the presence of a MF signal.

Now, the structure and the operation of the maximum level detector block B will be described in accordance with FIG. 2 and FIG. 4.

In the embodiment below, it is assumed that the circuit is utilized for the No. 5 MF signals recommended by CCITT, in which the MF signal having the level between $-4$ dB and $-26$ dB must be detected, and the level lower than $-36$ dB must not be detected, and two MF signals may have the level difference less than 7 dB. In order to comply with that recommendation, the present system detects the level higher than $-31$ dB with the level difference less than 12 dB.

Also, it is assumed that MF signals are transmitted in a digital form having a frame duration 125 $\mu$S with a frame pulse FP (see FIG. 4(a)), and MF signals exist in each frame in the predetermined time slot after the time $T_1$ from each preceding frame pulse. Said time slot having MF signals continues the duration $T_2$.

Since the MF signal in the time slot $T_2$ is the output of the digital filter, said time slot $T_2$ has six sub-time slots each assigned to 700, 900, 1100, 1300, 1500 and 1700 Hz, and two of these sub-time slots are filled.

In FIG. 2, the reference numerals 34, 35 and 37 are first, second and third selectors, each having a pair of input terminals (a) and (b), and a control terminal (c), and when the control signal at the control terminal (c) is ON, the first input signal at the terminal (a) is selected and is provided at the output of each selector, while when the control signal at the control terminal (c) is OFF, the second input signal at the input terminal (b) is selected and is provided at the output terminal of each selector. The reference numeral 33 is a fixed reference level source, which provides $-19$ dB in this embodiment ($-19 = -31 + 12$). The ($-31$ dB) is the lowest level to be detected, and ($+12$ dB) is for compensating the attenuation in the attenuator 40 described later. The reference numeral 36 is a comparator, 44 and 45 are delay circuits for compensating the delay time in the comparator 36, 40 is an attenuator having the fixed attenuation (12 dB) in this embodiment. Since 12 dB is ¼, that attenuator is obtained only by shifting each of the data bits by 2 positions in a shift register. That attenuator 40 of 12 dB is provided because two MF signals may have the level difference less than 12 dB. The reference numeral 39 is a multiplicator, which multiplicates the constant $\alpha$ which is smaller than 1 but is closer to 1 to an input signal of the same, the reference numeral 38 is a delay circuit having the delay time of a unit frame duration (=125 $\mu$S), and 42 is an AND circuit.

To the control terminal 32, the control signal which is ON during the duration $T_1$ from each frame pulse FP is applied as shown in FIG. 4(b), and that control signal is applied to the control terminals (c) of the selectors 34 and 35. Accordingly, the selectors 34 and 35 select the first inputs (a), and so the fixed level ($-19$ dB) of the fixed reference level source 33, and the output of the multiplicator 39 are applied to the comparator 36. In this case, it should be appreciated that the output of the multiplicator 39 is the product of $\alpha$ (which is close to 1) and the maximum level at the output of the selector 37 in the preceding frame duration. The outputs of the selectors 34 and 35 are also applied to the first and the second inputs (a) and (b) of another selector 37 through the delay circuits 44 and 45. The selector 37 is controlled by the output of the comparator 36 so that the higher level between the outputs of the selectors 34 and 35 is provided at the output of the selector 37. The output of the selector 37 is applied to the input terminal (b) of the selector 35 directly and the input terminal (a) of the selector 35 through the multiplicator 39, the delay circuit 38 and the AND circuit 42.

Accordingly, it should be appreciated that during the duration $T_1$ that the control signal at the terminal 32 is ON, the selector 37 provides the higher level between the output of the reference source 33 ($=-19$ dB) and the output of the multiplicator 39 which is the product of $\alpha$ and the output of the selector 37 in the preceding frame (see FIG. 4(e)).

Next, the control signal at the control terminal 32 becomes OFF until the next frame pulse FP as shown in FIG. 4(b), and in that duration, there exists the time slot $T_2$ in which MF signals exist. Further, in that time slot $T_2$, the selectors 34 and 35 select the input terminals (b). Accordingly, the first selector 34 selects the MF signal at the output of the absolute value circuit 24 or the output of the digital filter (see FIG. 4(c)), and the second selector 35 selects the output of the third selector 37 (see FIG. 4(d)). Then, the comparator 36 compares the output of the first selector 34 with the output of the second selector 35, or the output of the digital filter with the output of the third selector 37, and the higher level between the two is selected by the third selector 37. Therefore, the output of the third selector 37 is the higher one between the output of the digital filter and the output of the third selector 37 (see FIG. 4(e)). That output of the third selector 37 is applied again to the terminal (b) of the second selector 35, and the comparison is performed again between the new output of the selector 37 and the new output of the digital filter. Accordingly, at the end of the time slot $T_2$ in each frame, the output of the third selector 37 is the highest one among (1) the fixed level of the source 33(=−19 dB), (2) the highest level of the third selector 37 in the preceding frame, and (3) the highest level of the block B in the present frame.

The output of the third selector 37 is applied to the terminal (a) of the second selector 35 through the AND circuit 42, the delay circuit 38 and the multiplicator 39 as the reference level of the next frame. In this case, since the value $\alpha$ is smaller than one but is closer to one, the output level of the multiplicator 39 is almost the same as the output level of the third selector 37. The output of the third selector 37 is applied to the comparator 8 through the attenuator 40 (12 dB) as the variable threshold level.

In the above explanation, the AND circuit 42 is opened when the strobe pulse at the terminal 43 exists (see FIG. 4(f)). That strobe pulse is supplied by an exteral apparatus when MF signals are to be detected as shown in FIG. 4.

In the above explanation is should be appreciated that the circuit loop comprising the delay circuit 38, the multiplicator 39 and the selectors 35 and 37 composes substantially a digital low pass filter, and that low pass filter operates as a smoother of the maximum level at the output of the selector 37. Also, it should be appreciated that said digital low pass filter has no amplifier nor attenuator in the loop. Since there is no amplifier, the word length of the digital data in the loop can be short, and that nature is beneficial as to increase the number of channels which are handled at the same time on a time divisional basis. Further, it should be appreciated that the time constant of that smoother when the signal level is rising, is short, that is to say, the level of the output of the selector 37 is established very quickly. And further, the time constant of that smoother when the signal level is falling, is long the level of the output of the selector 37 is lowered very slowly depending upon the value $\alpha$ of the multiplicator 39. Since the value $\alpha$ is close to one, the falling time constant is very long.

Since the falling time constant is long enough, the threshold level at the output of the selector 37 does not deviate in spite of the rapid change of an input signal and/or the change of the number of the multiplexed channels.

That multiplicator 39 can be implemented simply by the combination of a shift register and an adder when the value $\alpha$ is designed to be $1-2^N$, where N is a positive integer.

As mentioned above in detail, the output of the selector 37 is the maximum level among (1) the maximum level in the MF signals (700 through 1700 Hz) in the present frame, (2) the maximum level in the preceding frame, and (3) the fixed level (−19 dB). That output level of the selector 37 is applied to the comparator 8 through the attenuator 40 as the variable threshold level, and that comparator 8 receives the other signal (MF signal) from the digital filter through the absolute value circuit 24, and the delay circuit 31 which compensates the delay time in the maximum level detector block B. Accordingly, the threshold level of the comparator 8 is variable depending upon the highest signal level, and when the signal level is high, the threshold level is also high, and when the signal level is low, the threshold level is also low. That attenuator 40 of (12 dB) is provided in order to detect the MF signals even when there is a level difference less than 12 dB between two MF signals.

The comparator 8 compares the input signal at the first input terminal (a) from the digital filter with the variable threshold level at the terminal (b), and when the former is higher than the latter, the comparator 8 provides the output signal indicating that the MF signal of the particular frequency is detected. That output of the comparator 8 is applied to an external circuit or an electronic exchange system through a latch circuit 9, which holds the output level of the comparator for a predetermined duration. As the detected MF signal is a time divisional signal, which has each particular frequency (700–1700 Hz) at each corresponding time slot, an external circuit (not shown) can easily detect each of MF signals by strobing the output of the latch circuit 9 with some gate pulses assigned at the time slot of each MF signal.

As described above in detail, two of the important features of the present invention are (1) the use of a recursive digital filter, and (2) the use of the variable threshold level, and some effects obtained by the above features are enumerated below.

(a) The time for detecting the particular frequency is short, and the present invention can follow the rapid signal, since that time is defined by the rise time of a digital filter, but that time is independent from the greatest common measure of the input frequencies.

(b) The frequency detection of multiplexed channels is possible since a digital filter is utilized, instead of a prior DFT circuit.

(c) The frequency to be detected is changed simply by changing the coefficients in the ROM 23.

(d) The operational range of the input signal level can be large, that is to say, the present invention can detect even when the input signal is very low, and/or very high, since a variable threshold (VTH) is utilized.

(e) Due to the particular structure of the digital low pass filter for providing said variable threshold, the variable threshold is considerably stable.

From the foregoing it will now be apparent that a new and improved digital multi-frequency receiver has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A digital multi-frequency receiver for detecting particular frequencies in a digitalized input signal comprising;

(a) an input terminal for receiving said digitalized input signal,
   (b) a digital filter block connected to said input terminal having a digital bandpass filter for detecting the particular frequencies on a time divisional basis, a coefficient generator for providing coefficients for the operation of said digital filter, and an input control circuit for operating said digital filter as a recursive digital filter by providing an input signal to said digital filter recursively and selecting coefficients in said coefficient generator, (c) an absolute value circuit connected to the output of said digital filter block for providing an absolute digital value of the output of the digital filter block, (d) a comparator for comparing the output of the absolute value circuit with a variable threshold, (e) means for providing a compared result by the comparator to an output terminal for indicating the presence of the particular frequencies when the output of the absolute value circuit is higher than the variable threshold, and (f) means for providing said variable threshold to said comparator by selecting the maximum value from among (i) a predetermined fixed value, (ii) the product of the predetermined value $\alpha$ which is less than 1 and the maximum value of the variable threshold means in a preceding frame, and (iii) the maximum value of the output of the absolute value circuit in a present frame.

2. A digital multi-frequency receiver according to claim 1, wherein said means for providing the variable threshold comprises;

(a) a reference level source for providing the predetermined fixed value, (b) a first selector for selecting one of the outputs of the absolute value circuit or the reference level source, (c) a second selector, (d) a comparator and a third selector for selecting the larger one of the outputs of said first selector and said second selector, said third selector being connected to an input 15 of the second selector, (e) a delay circuit for providing a delay time equal to each frame duration, said delay circuit being coupled to the output of said third selector, (f) a multiplyer for multiplying a constant value $\alpha$ which is less than 1 by the output of the delay circuit, the output of the multiplyer being connected to another input of said second selector, and (g) means for controlling said first selector and said second selector so that said first and second selectors select one input thereto for a predetermined duration in each frame and select the other input for the remaining portion of each frame.

3. A digital multi-frequency receiver according to claim 1, wherein said digital filter is a quadratic digital filter, and said input control circuit controls the digital filter recursively to operate the same as a biquadratic digital filter.

4. A digital multi-frequency receiver according to claim 1, further comprising a delay circuit provided between the output of the absolute value circuit and the input of the comparator for compensating for the delay time in the variable threshold means.

5. A digital multi-frequency receiver according to claim 1, wherein the frequencies to be detected are 700, 900, 1100, 1300, 1500 and 1700 Hz.

6. A digital multi-frequency receiver according to claim 1, further comprising an attenuator inserted between the output of a variable threshold means and the variable threshold input of the comparator for providing a predetermined fixed attenuation.

* * * * *